March 30, 1954

H. B. WILLIAMS 2,673,407

GRAVE DIGGER

Filed Oct. 12, 1950

Hugh B. Williams
INVENTOR.

BY Lester B. Clark

ATTORNEY

March 30, 1954  H. B. WILLIAMS  2,673,407
GRAVE DIGGER

Filed Oct. 12, 1950  6 Sheets-Sheet 2

Hugh B. Williams
INVENTOR.

BY Lester B. Clark
ATTORNEY

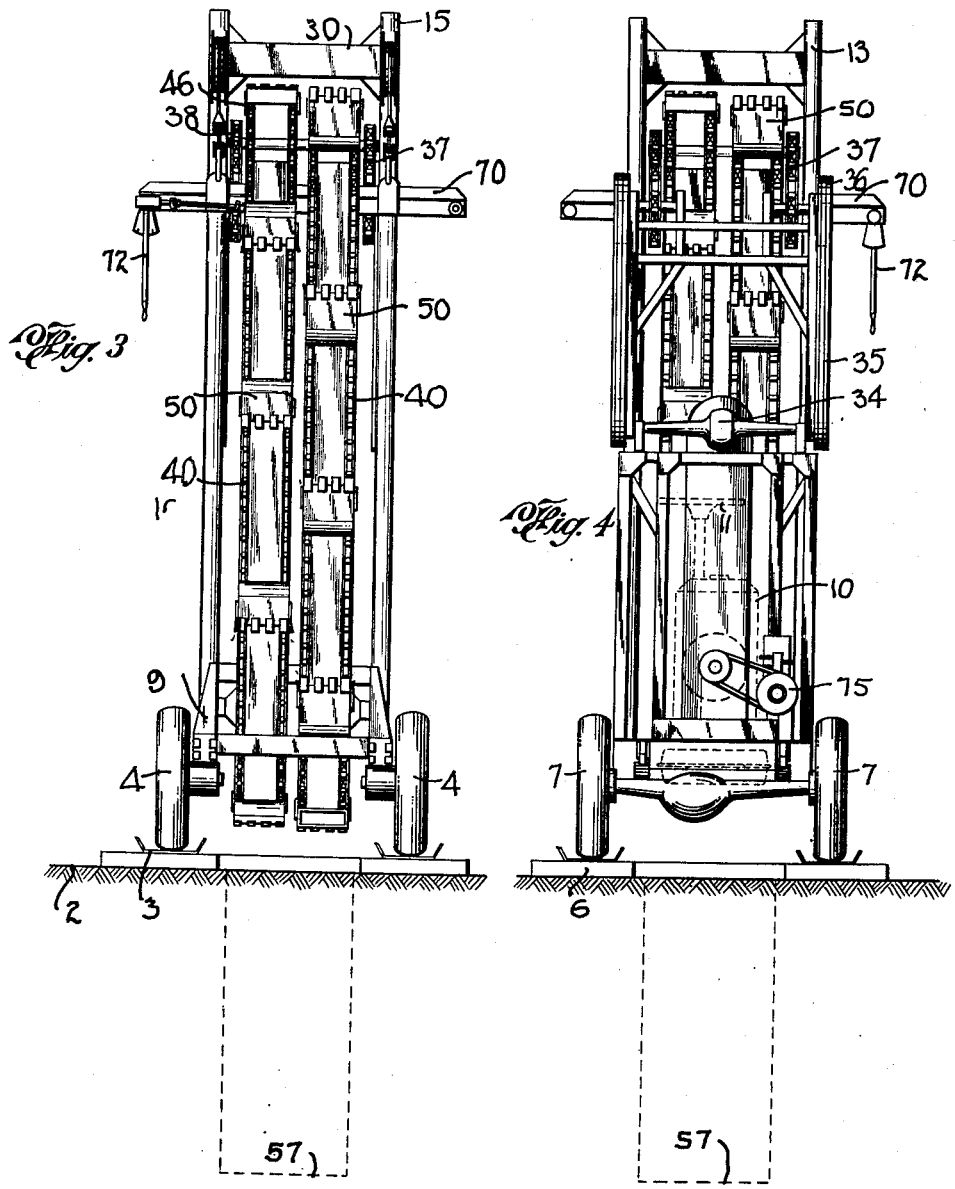

March 30, 1954    H. B. WILLIAMS    2,673,407
GRAVE DIGGER

Filed Oct. 12, 1950    6 Sheets-Sheet 4

Hugh B. Williams
INVENTOR.

BY Lester B. Clark

ATTORNEY

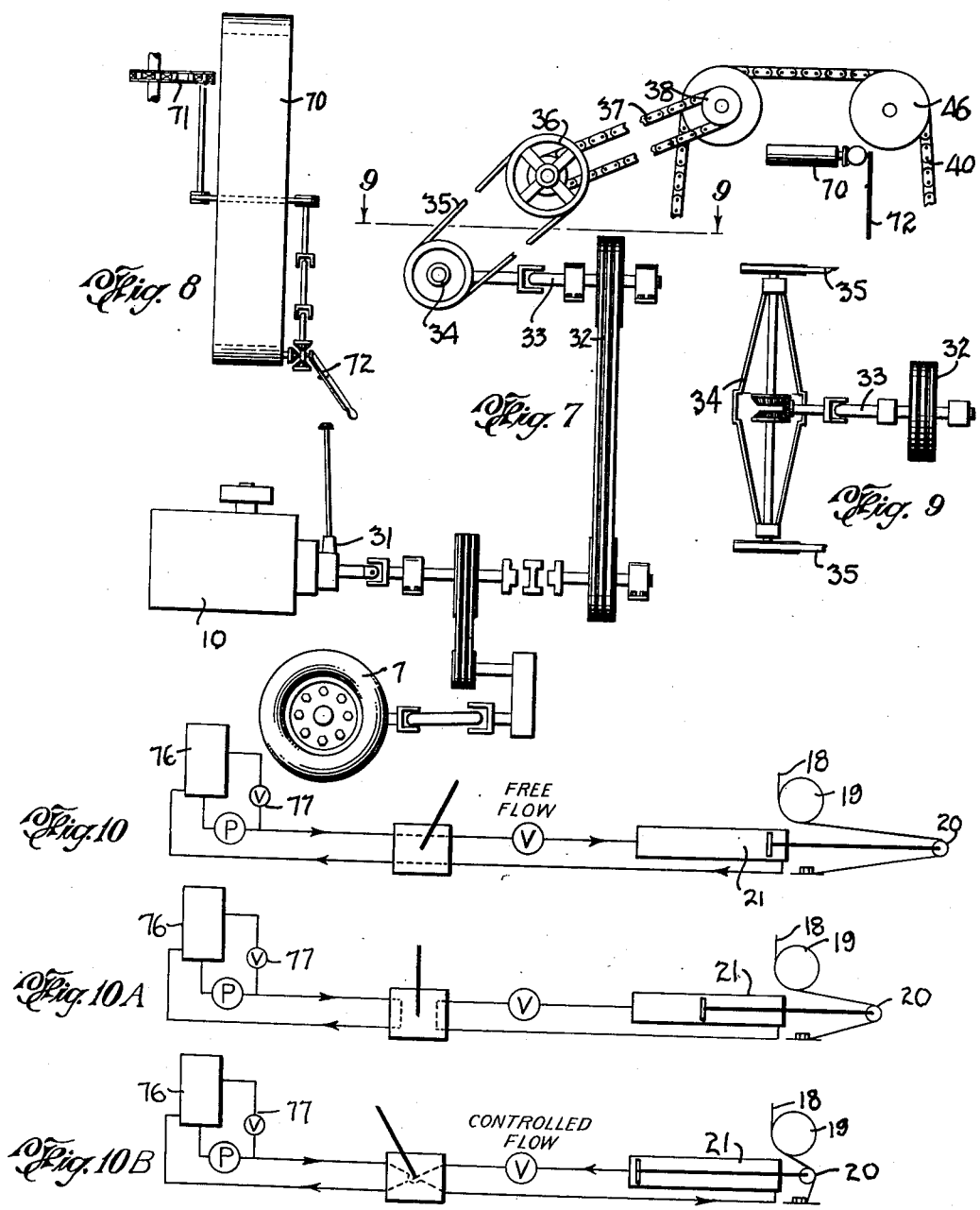

March 30, 1954
H. B. WILLIAMS
GRAVE DIGGER
2,673,407
Filed Oct. 12, 1950
6 Sheets-Sheet 6
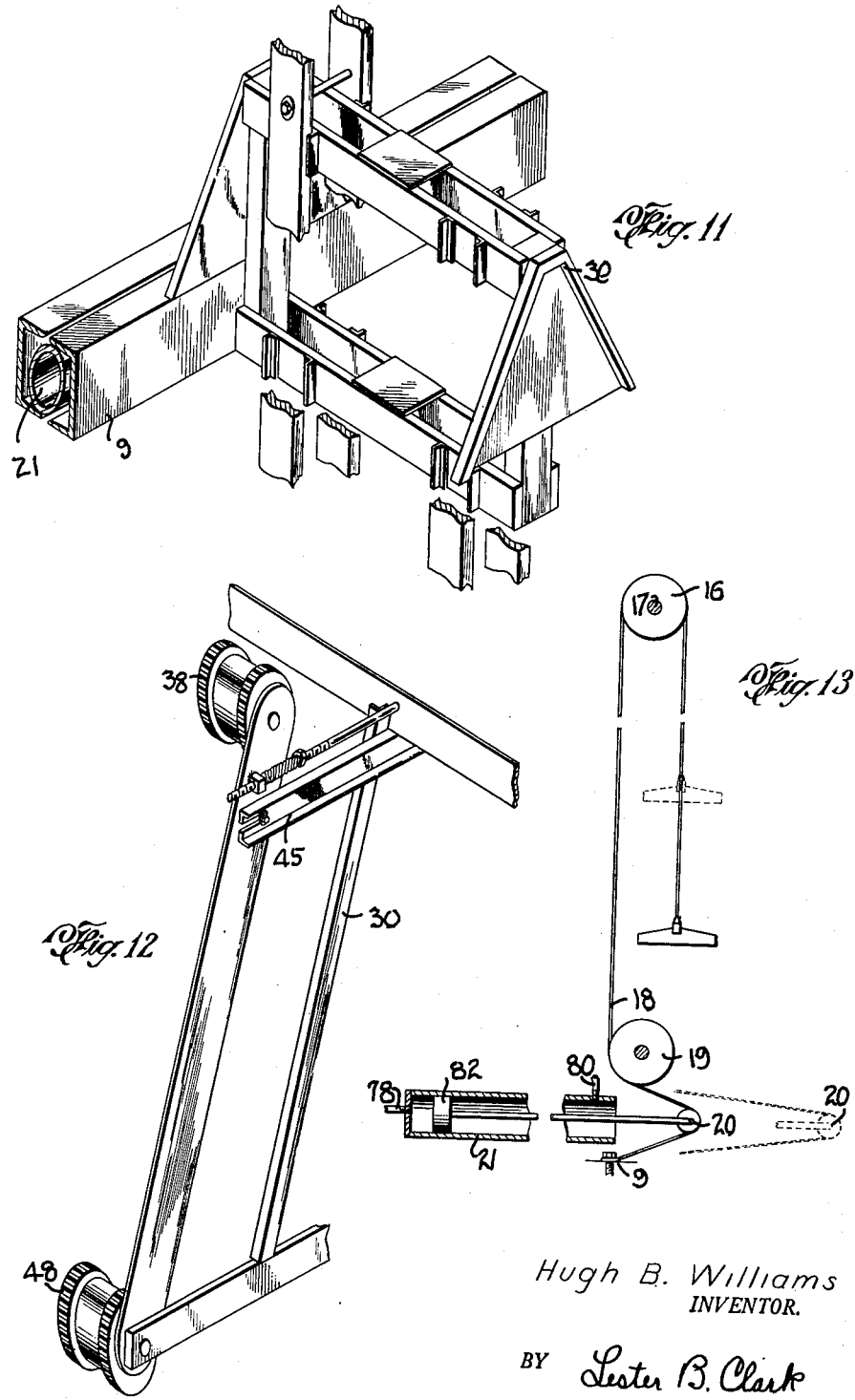
Hugh B. Williams
INVENTOR.
BY Lester B. Clark
ATTORNEY

Patented Mar. 30, 1954

2,673,407

UNITED STATES PATENT OFFICE 2,673,407

GRAVE DIGGER

Hugh B. Williams, Dallas County, Tex.

Application October 12, 1950, Serial No. 189,771

2 Claims. (Cl. 37—86)

The invention relates to a grave digging machine which can be positioned to straddle the location where the grave is to be dug and then operated for the excavation for the grave in a single operation by lowering an excavating frame to elevate the earth, after which the frame is raised and the machine moved on to the next location. There is to be no movement or adjustment of the machine relative to the location after the grave is once started.

Efforts have been made theretofore to provide a mechanical device for digging graves but in most instances an excavation is started and then the machine is moved longitudinally in order to effect the lengthwise excavation of the slot or opening. As distinguished from such an operation, the present machine embodies a frame which carries excavator buckets and which will be lowered into the earth so as to excavate an opening the exact size of a standard grave by making the entire excavation as a single operation.

It is one of the objects of the invention to provide a mobile machine or unit wherein the vehicle may be positioned to straddle the location where the grave is to be dug and then manipulated to dig the grave without moving the machine longitudinally or laterally while it is disposed astride the grave location.

Another object of the invention is to provide a vehicle which has an open chassis in which is suspended an excavating frame so that the frame may be lowered through the chassis and the excavation accomplished in a single operation.

A still further object of the invention is to provide a grave excavating frame which is suspended on a vehicle having an open chassis through which the frame may be vertically moved in order to accomplish the digging of the grave.

A still further object of the invention is to provide a vehicle with an open chassis wherein an excavating frame is disposed with a plurality of endless excavating chains mounted thereon so as to excavate an opening the size of a standard grave.

A still further object of the invention is to provide a trapezoidal shaped frame wherein a base having excavating buckets movable therearound cuts an opening the same size as the grave which is to be dug.

Another object of the invention is to provide a grave digging frame having a pair of side by side endless chain excavators which travel in opposite directions so as to compensate for torque on the machinery and the framework and to also compensate for any longitudinal thrust due to the digging forces.

A still further object of the invention is to provide an excavating frame in a grave digging machine whereby the frame may be hoisted and lowered while the excavating chains thereon are continued in operation during such vertical movement so that the grave may be dug as a single operation.

Still further objects of the invention include a mechanical drive for the excavating chains and buckets in a grave digging machine in combination with a hydraulic hoist or lift device whereby the excavating frame will be lowered during the excavating operation and then retrieved after the excavation operation has been completed.

A still further object of the invention is to provide a vehicle having a mobile construction so that the entire machine may be self propelled and self operated by utilizing the power unit of the vehicle to perform the excavating and also including a hydraulic lift arrangement for manipulation of the excavating frame.

The machine has been actually constructed and successfully operated and embodies the structure as shown in the drawings herein.

Other and further objects of the invention will be readily apparent when the following description is considered in connection with the accompanying drawings, wherein:

Fig. 3 is a rear end elevation of the machine as viewed in Fig. 2.

Fig. 4 is a front end elevation as viewed from the left of Fig. 2.

Fig. 7 is a diagrammatic view of the vehicle power unit and illustrating the driving connections of the vehicle for the excavating machinery and also including the hydraulic lift arrangement.

Fig. 8 is a top plan view looking down on the conveyor belt for discharging the earth laterally and illustrating the clutching and reversing arrangement therefor.

Fig. 9 is a broken detail view of the gearing mechanism by which the two excavator chains are driven in opposite directions from a single source of power.

Figs. 10, 10A, and 10B are diagrammatic arrangements of the hydraulic mechanism for lowering and elevating the excavating frame and illustrating the hydraulic control therefor.

Fig. 11 is a broken perspective view of the hydraulic mechanism for lowering and elevating the excavator frame.

Fig. 12 is a broken detailed perspective view of the gear mechanism for driving the excavator chains.

Fig. 13 is a diagrammatic showing of the hydraulic arrangement to show how the power is applied in lifting and lowering the excavating frame relative to the vehicle and the chassis thereof.

Figure 1:
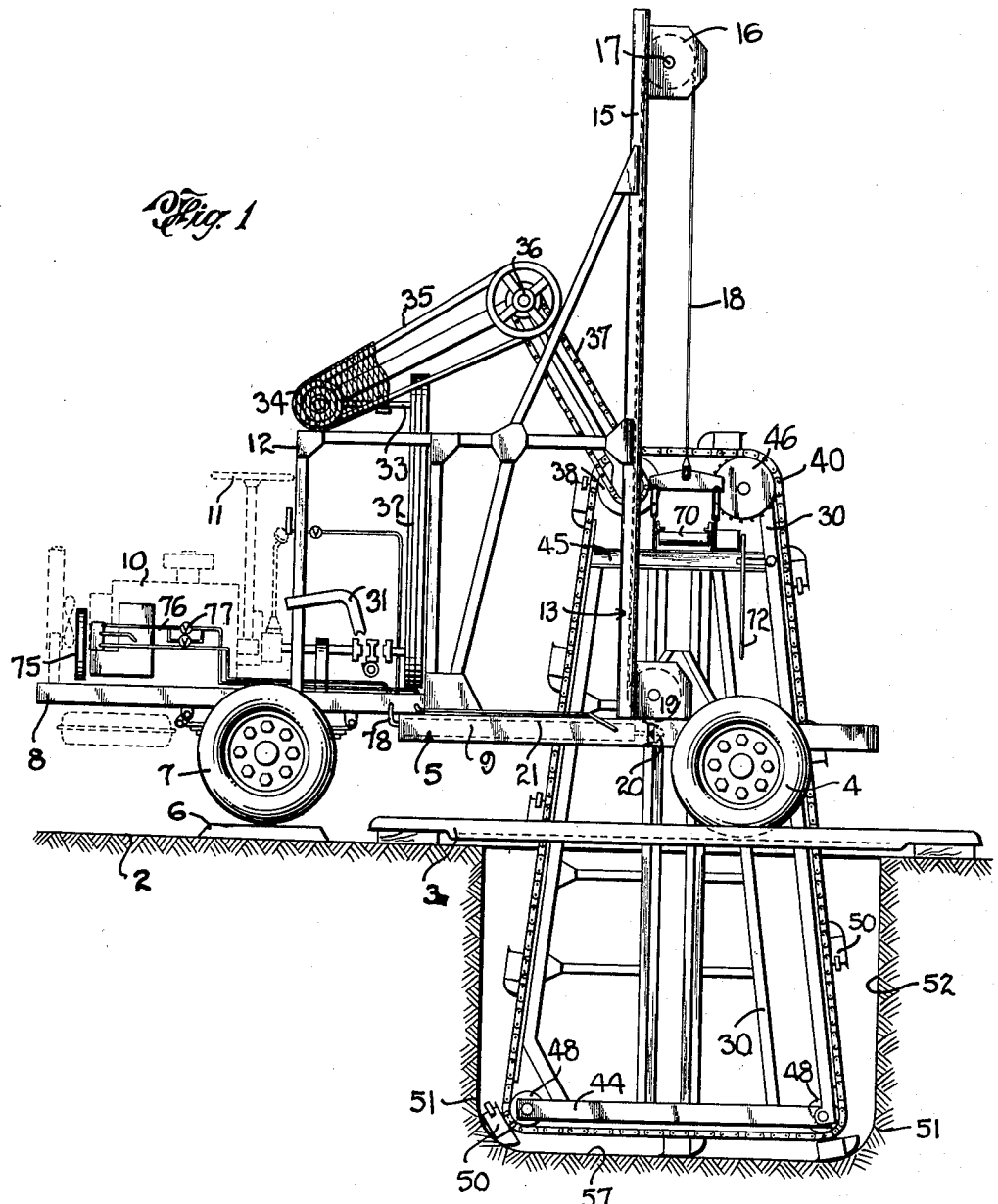
Fig. 1 is a side elevation of the machine arranged, straddling the grave location and wherein the mechanism has been operated to excavate the grave and the view further illustrates the excavating frame in its final position prior to being removed from the grave opening.

In Fig. 1 the ground elevation 2 has the track way 3 disposed thereon so as to suitably support the rear wheels 4 of the vehicle 5 which is the grave digging machine. Suitable blocks 6 may be arranged to support the front wheels 7 if desired. No such track way or block may be necessary in solid foundation or earth formation.

The machine generally is a truck and in actual operation a four wheeled drive truck or a front wheel drive truck in particular may be used. The truck has the usual chassis 8 which has been modified by the grave digger chassis 9.

The usual engine or power unit 10 of the truck is provided along with the steering mechanism 11.

The chassis 9 has been modified to some extent by providing the supporting structure 12 and the hoisting mechanism 13.

The hoisting mechanism is in the form of a mast or upstanding support 15, which carries a pulley wheel 16 mounted on the sheave pin 17.

This hoisting means is provided with a flexible cable 18 which passes around a pulley wheel 19 and over the head 20 of a hydraulic cylinder 21 as thus seen in Fig. 13. It seems obvious that when fluid under pressure is forced into the hydraulic cylinder that the plunger head 20 will move to the right as seen in Fig. 1 and exert a pull upon the cable 18 which is in turn attached to the excavator frame 30 of the digging machine. In this manner the frame 30 may be raised and lowered at will and by suitable controls for such hydraulic cylinders as are well known.

The vehicle will travel to the desired location and will then straddle the exact spot where the grave is to be dug so as to position the open frame work 9 directly over the grave location.

To accomplish the excavating or digging of the grave the clutch mechanism 31 will be actuated to drive the belt 32 for turning of the shaft 33. This shaft drives a suitable power divider gear 34 whereby the opposite drive chains 35 cause rotation of the intermediate shaft 36 which in turn drives the chains 37 which pass over the wheels 38 which serve as the drive shaft for the adjacently spaced excavator chains or members 40.

The vertically traveling frame 30 is a rigid structure having the longitudinally disposed face 44 and having the upper spacer 45 which is adjustable to determine the spacing of the top rollers 38 and 46. This is necessary in order to determine the tension on the excavator chains 40.

Generally the shape of the frame 30 in side elevation is that of a trapezoid because the upper length 45 is less than the length base 44.

The length of the base 44 which carries the rollers 48 at each corner thereof will be such that the buckets 50 on each of the excavator chains 40 will be spaced apart when they begin the lower turn 51 a sufficient distance such that the space between the points 51 as seen in Fig. 1 will be the length of a standard grave. Particular attention is directed to the fact that the grave excavation has the vertical sides 52 so that no manual labor is required to trim or shape the grave. These vertical sides are cut by the buckets 50 as they pass around the wheels 48 at the base of the frame and as the frame is gradually lowered a precise rectangular grave opening will be dug.

Figure 2:
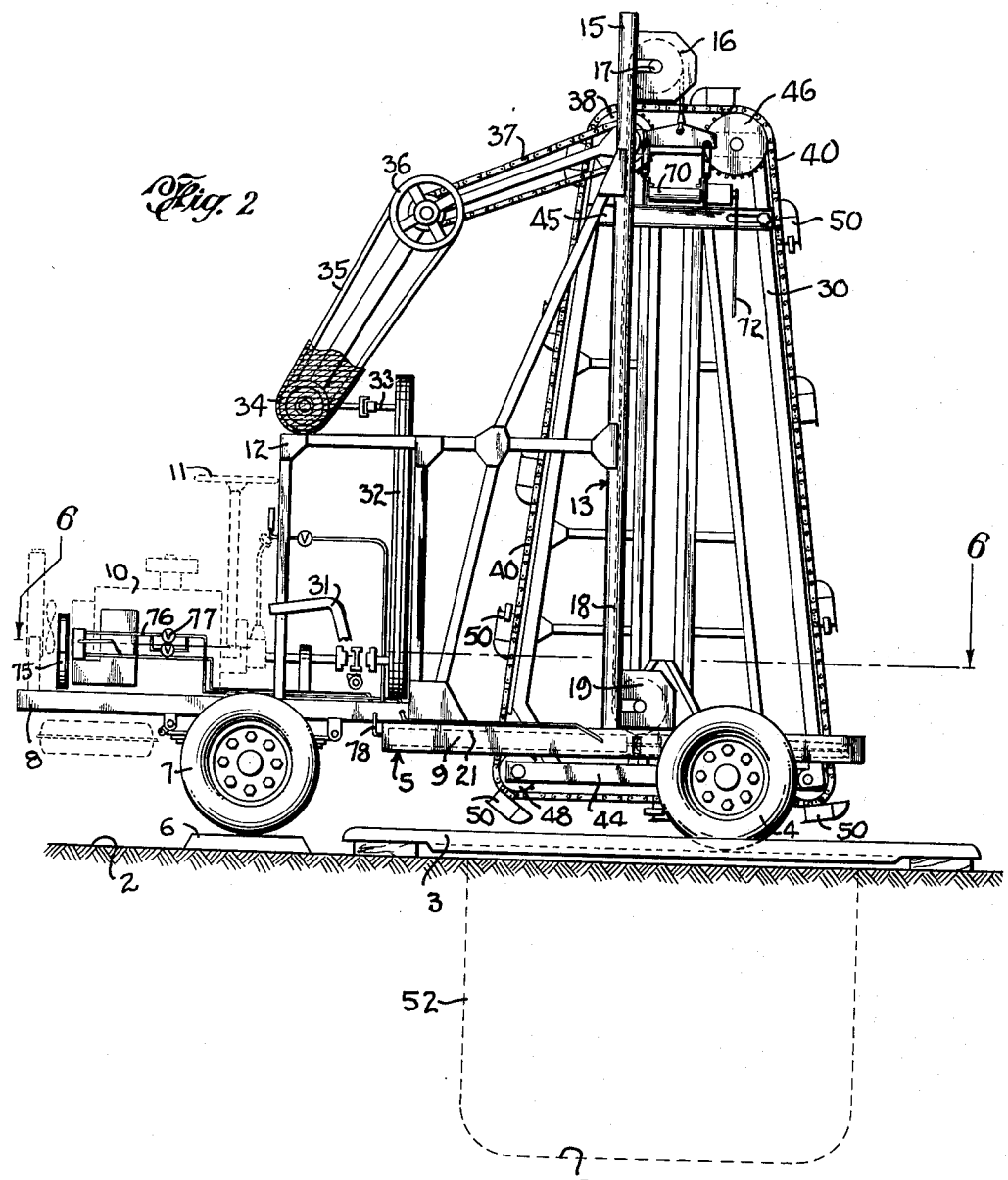
Fig. 2 is a side elevation similar to Fig. 1, but illustrating the excavating frame as having been elevated after completing excavation and with the parts in position ready for the grave digging machine to move on to the next location.
Figure 5:
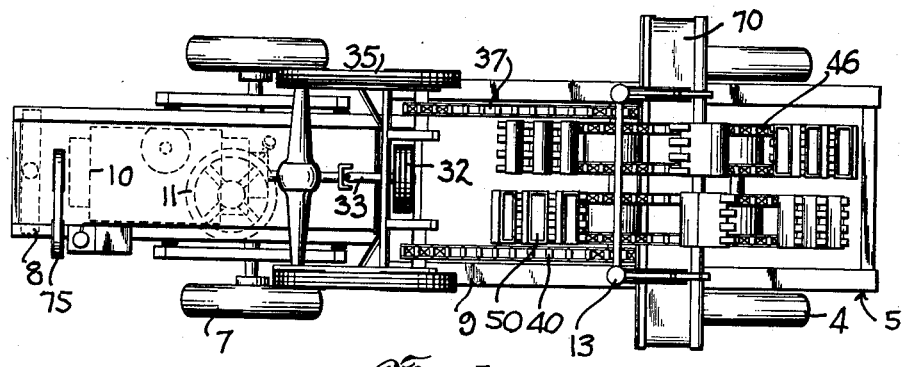
Fig. 5 is a top plan view looking down on the machine of Fig. 2.
Figure 6:
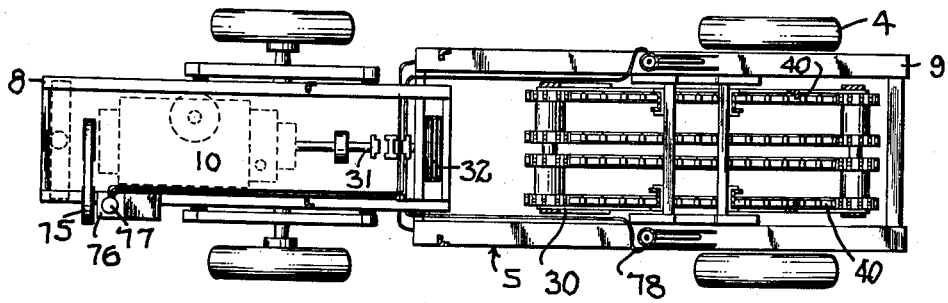
Fig. 6 is a transverse sectional view taken on the line 6—6 of Fig. 2 and looking down on the mechanism.

The buckets pass along or below the base 44 of the frame to cut a flat bottom 57 for the grave which also does not require any trimming after the excavator frame has been raised to the position shown in Fig. 2.

As best seen in Figs. 3 and 4, the excavator frame carries two of the excavator chains or members 40 which are arranged in side by side relationship closely adjacent each other so that the total width of the two excavators will be the same as the width of the grave which is to be dug.

It will be noted that the buckets 50 on the right hand chain in Fig. 3 are facing upwardly while the buckets 50 on the left hand are facing downwardly and this arrangement has been provided so that as the chains travel in opposite directions they will compensate for the longitudinal thrust due to the engagement of the buckets against the earth. This oppositely driving arrangement of the chains also eliminates the tendency for torque upon the machine due to the resistance of the earth to being excavated.

As the buckets on each of the chains pass across the top of the frame work it seems obvious that the earth will fall by gravity into the central portion of the frame so as to empty the bucket.

Extending transversely of the frame and intermediate the upper end thereof a conveyor belt 70 has been provided which is mounted upon suitable bearings and which is driven by a chain. This conveyor belt extends laterally to each side of the frame as best seen in Figs. 3 and 4 and is controlled by a reversing mechanism 72 so that it may be driven in either direction to discharge the excavated earth at either end into a suitable dump pile or dump trucks as may be desired.

In order to provide a source of power liquid for the hydraulic arrangement a pump 75 has been connected on the engine as best seen in Fig. 1. A suitable arrangement of piping connection 76 and valve 77 have been provided but these may be of well known design and need not be further described except to point out that a pipe 78 enters into the end of the cylinder 21 as best seen in Fig. 13 so as to provide liquid to force the piston 82 to the right and elevate the excavating frame while the pipe 80 on the other end of the cylinder 21 provides a liquid for returning the piston 82 to the position shown in Fig. 13 so as to control the lowering operation of the excavating frame.

It is believed that the operation of the grave digging will be obvious from the foregoing explanation of the structure and function thereof and that no detailed continuous explanation of the operation is necessary. Many of the details of the ordinary and usual type of mechanisms such as clutches, shafts and bearings have not been described because they do not enter into the invention as such which relates generally to a grave digging machine.

Broadly the invention contemplates a machine which will be moved to the location where the grave is to be dug and the excavating of the grave completed in total in a single lowering and retrieving operation of the excavating frame in such a manner that no trimming or manual labor is required after the machine is moved away from the location.

What is claimed is:

1. A grave digger comprising a vehicle, an open chassis portion adjacent one end, an excavator frame mounted for vertical movement through said chassis, an upstanding support on said chassis, means on said chassis and said support to suspend, raise or lower said frame in the excavating of a standard grave, a pair of excavator members arranged in edge to edge relation and mounted to travel substantially coaxially around the edge of said frame, digger and conveyor buckets on each member arranged so that buckets on both members dig simultaneously, a power unit on said vehicle connected to move said members in directions counter to one another to compensate for torque and thrust, and a connection from said power unit to said first means to positively control and insure the automatic continuous downward movement of the frame.

2. A grave digger comprising a vehicle, an open chassis portion adjacent one end, an excavator frame mounted for vertical movement through said chassis, an upstanding support on said chassis, means on said chassis and said support to suspend, raise or lower said frame in the excavating of a standard grave, a pair of side by side excavator members arranged in edge to edge relation and coaxially mounted to travel around the bottom reach of said frame, digger and conveyor buckets on each member in spaced relation a distance apart less than the length of said bottom reach so that buckets on both members are simultaneously in digging engagement with the earth, a power unit on said vehicle connected to move said members in opposite directions to compensate for torque and thrust, a connection from said unit to said first means to positively control and insure the automatic continuous downward movement of the frame, and an earth conveyor belt disposed to travel transversely of said frame and within said members to receive and discharge the bucket dug earth laterally of the vehicle.

HUGH BROMLEE WILLIAMS.

References Cited in the file of this patent
UNITED STATES PATENTS

| Number | Name | Date |
|---|---|---|
| 994,380 | Fasselly | June 6, 1911 |
| 1,071,085 | Poulter | Aug. 26, 1913 |
| 1,365,748 | Thorn | Jan. 18, 1921 |
| 1,531,755 | Radovich | Mar. 31, 1925 |
| 1,866,037 | Heim et al. | July 5, 1932 |
| 2,052,372 | Van Voorhis et al. | Aug. 25, 1936 |
| 2,209,732 | Huey | July 30, 1940 |
| 2,381,085 | Snyder | Aug. 7, 1945 |
| 2,501,083 | Owen | Mar. 21, 1950 |